United States Patent [19]

Reeser

[11] Patent Number: 4,973,970

[45] Date of Patent: Nov. 27, 1990

[54] INTEGRATED AUTOMATED SYSTEM FOR WASTE SITE CHARACTERIZATION

[75] Inventor: Harold G. Reeser, Cardiff, Calif.

[73] Assignee: General Atomics, San Diego, Calif.

[21] Appl. No.: 380,116

[22] Filed: Jul. 14, 1989

[51] Int. Cl.$^5$ .............................................. G01V 3/08
[52] U.S. Cl. ................................... 342/357; 324/323; 364/449
[58] Field of Search ............... 342/352, 357; 324/326, 324/330, 331, 323; 364/424, 443, 444, 449; 367/19

[56] References Cited

U.S. PATENT DOCUMENTS 4,008,469  2/1977  Chapman .
4,381,544  4/1983  Stamm .
4,814,711  3/1989  Olsen et al. .

Primary Examiner—Stephen C. Buczinski
Assistant Examiner—Mark Hellner
Attorney, Agent, or Firm—Neil K. Nydegger

[57] ABSTRACT

A system for characterizing contamination levels of a selected site uses a base station for the collection of data and generating waste site characterization and remediation needs reports. An on-site station is provided to detect the contamination levels at selected points within the site and transmit this data to the base station. The on-site station also includes a transceiver which relays information to the base station from the Global Positioning System satellite constellation which pertains to the precise location of the on-site station within the site to be characterized. The base station may also have a specific transceiver which is in communication with the Global Positioning System satellite constellation for determining the precise topographical position of the base station and for correlating this data with the topographical position of the on-site station to refine the latter. Both the on-site station and the base station include transceivers which permit communication between these stations for the purpose of directing and refining field operations.

21 Claims, 1 Drawing Sheet

INTEGRATED AUTOMATED SYSTEM FOR WASTE SITE CHARACTERIZATION

FIELD OF THE INVENTION

The present invention pertains to systems which are useful for mapping and characterizing the contamination levels within a preselected site location. More particularly, the present invention pertains to a site characterization system which uses the Global Positioning System (GPS) satellites to precisely locate each particular point within the selected site location at which a contamination level reading is taken. The present invention is particularly, but not exclusively, useful for obtaining numerous contamination level readings within a very large topographical area.

BACKGROUND OF THE INVENTION

Under most circumstances, it has become increasingly obvious that the environmental impact of contamination, in any of its many and varied forms, is simply unacceptable. In some cases, the location and identification of the particular contamination is readily apparent. In others, the location and identification of the contamination can pose a problem. In any event, the necessary objective is to decontaminate the affected area in some way. Unfortunately, with advances in technology, it is not now uncommon for vast areas to be contaminated or polluted by highly dangerous nuclear or toxic materials. Furthermore, the problem of locating contamination is not lessened merely by the fact an extensive area is involved. Indeed, this fact may aggravate the problem.

Various detectors have been proposed for use in determining the nature and concentration level of a contaminant or pollutant. Typically, however, they do not provide direct information on the location of the contamination. Instead, such information is obtained from maps or some other ground-based reference system. Unfortunately, these references can be inaccurate. This is particularly so when the contamination is airborne or waterborne and dispersed throughout a very large area. Moreover, even after an initial clean up has been accomplished, it is possible for there to be residual contamination, and in such cases it may be necessary to retrace paths over an extended area in order to determine the location of any residual contamination. Also, it is possible that the contamination is not just superficial. In such cases it may also be important to be able to bore into the surface of the earth and locate the point of contamination. Again, knowledge of the precise topographical location is important.

An example of an automated system which is designed to continuously link exact survey positions with field monitoring information is the ultrasonic ranging and data system (USRADS) which has been developed by Martin Marietta Energy Systems, Inc. in cooperation with the U.S. Department of Energy. The USRADS system incorporates a series of receivers on the perimeter of the particular site to be characterized and uses the differences in arrival times of ultrasonic pulses from the detector point to determine the exact location of the detector within the site area. This data is transmitted to a nearby microcomputer which calculates and records the position of the detector along with corresponding survey data. Such a system, however, requires ground-to-ground data links and, consequently, is susceptible to interference from ground clutter and obstacles. Further, such a system is somewhat limited in that the peripheral receivers are essentially stationary and must be appropriately positioned for the conduct of the survey. Accordingly, they may not lend themselves to coverage of a very large area wherein there is rugged topography.

The present invention recognizes that a site characterization system can be employed which does not rely solely on ground references for precisely locating the surveyor's exact position within the area at the time a contamination reading is taken. More specifically, the present invention recognizes that a site characterization system using position information from a GPS satellite will allow for mobile operation of a detector within a preselected site.

In light of the above, it is an object of the present invention to provide a site characterization system which gives reasonably accurate topographical information on the location where a contamination reading is taken within the area of a preselected site. Another object of the present invention is to provide a site characterization system which allows for the characterization of contamination and pollution levels over an extended area. Yet another object of the present invention is to provide a site characterization system which can incorporate a mobile base station and a plurality of mobile on-site stations in order to enhance the flexibility of the system in characterizing a particular selected site. Another object of the present invention is to provide a site characterization system which is compatible with various detectors for determining the respective levels of different contaminants. Still another object of the present invention is to provide a site characterization system which provides accurate site characterization within a relatively short period of time. Still another object of the present invention is to provide a site characterization system which allows characterization of the site in situ without having to extract or remove samples from the site for the conduct of laboratory tests. Yet another object of the present invention is to provide a site characterization system which can generate timely and accurate remediation reports based on waste site characterization results and the applicable regulatory requirements. Finally, another object of the present invention is to provide a site characterization system which is easy to use, relatively simple to manufacture and comparatively cost-effective in its employment.

SUMMARY OF THE INVENTION

A preferred embodiment of the novel GPS satellite constellation referenced site characterization system includes a base station which is established for the collection and recordation of data, for directing field operations, and for generating waste site characterization and remediation needs reports. A plurality of mobile on-site stations are also provided for movement throughout the area of the site to be characterized. Each of the on-site stations includes at least one detector for determining the contamination or pollution level at a selected point within the site area and also includes a transceiver for transmitting a signal to the base station which is indicative of the contamination level at the particular selected point within the site area. Further, the detector at any particular on-site station may include a probe which is able to bore into the earth's surface to determine subsurface contamination levels in the area of the site to be characterized. Additionally, the detector may have a probe which is able to record contamination levels at predetermined altitudes in the atmosphere above the on-site station. In any event, the detector and its associated apparatus for analyzing the sample permit in situ characterization of the contamination or pollution.

Each on-site station also includes a transceiver for receiving signals from the GPS satellite constellation to establish the spatial position of the on-site station relative to the satellite in the constellation and, hence, the topographical location of the on-site station within the site to be characterized. This signal, which is indicative of the topographical location of the on-site station, is transmitted to the base station where the on-site station location is correlated with the contamination level data collected at the location. The transceiver at the on-site station can also include voice and data transmission capabilities for direct communication with the base station.

The base station itself also includes a transceiver which receives signals from the GPS satellite constellation for the purpose of determining the spatial position of the base station relative to the satellite in the constellation. The base station may further include electronic apparatus to refine the topographical location of each of the on-site stations. Specifically, for this purpose, the apparatus interrelates the respective signals that indicate the topographical locations of the base station and each of the on-site stations relative to the GPS satellites.

The base station also includes apparatus for combining information concerning the topographical location of a particular on-site station with the data concerning contamination levels at that location. The information and data is then used to compile site characterization and remediation needs reports. In accordance with the present invention, a plurality of on-site stations may be provided for simultaneously determining contamination and pollution levels at various sites or at various locations within the area of a single site to be characterized. Further, the on-site stations, as well as the base station may be mobile in order to provide flexibility for the system and increase the speed with which data can be collected.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

The FIGURE is a schematic diagram of the site characterization system in accordance with the present invention indicating the flow of information between various stations in the system.

DESCRIPTION OF THE PREFERRED EMBODIMENT

Figure 1:
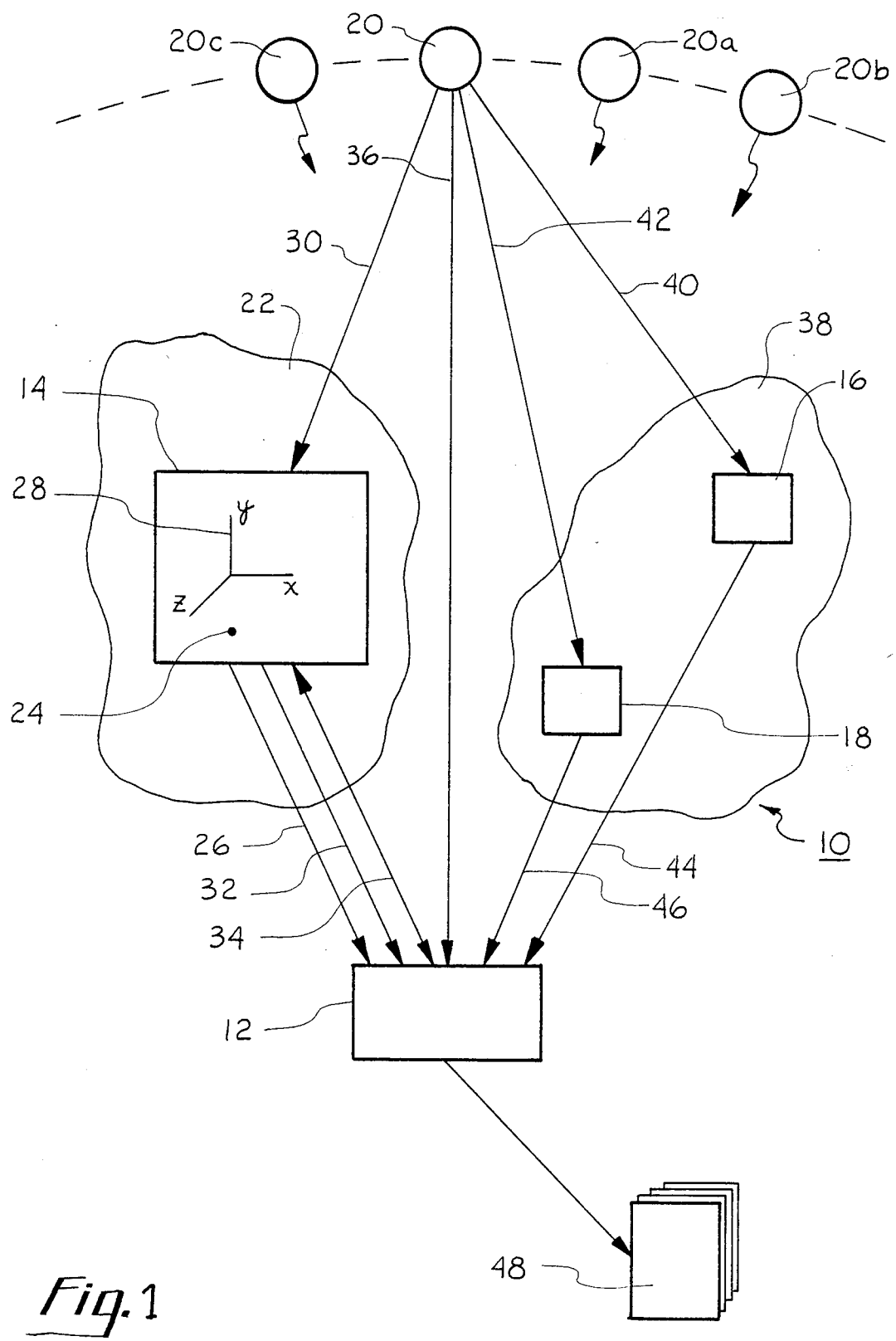

Referring to the FIGURE, a system for waste site characterization is shown and generally designated 10. As shown, the system 10 comprises a base station 12 and at least one on-site station 14. There may, however, be numerous other on-site stations of which the on-site stations 16 and 18 shown in the Figure are exemplary. As envisioned for the present invention, system 10 also incorporates and interacts with the Global Positioning System (GPS) satellite constellation which includes the representative satellites 20, 20a, 20b and 20c shown in the Figure. For simplicity, further discussion of the interaction between satellites in the GPS constellation with base station 12 and on-site station 14 will focus on satellite 20. It is to be appreciated, however, that references to satellite 20 pertain equally to the satellites 20a, 20b and 20c and, indeed, the appropriate signals are generated simultaneously from these satellites. It will be appreciated by the skilled artisan that for time and position data, to properly establish a ground-based location, the ground-based location must communicate with as many satellites as there are variables in the position data (i.e. the variables x, y, z and time).

The proper operation of system 10 relies on its ability to precisely establish the topographical locations of the on-site stations 14, 16 and 18 and use data collected by these stations for waste site characterization. It is known that satellite referenced locations can be determined with great accuracy. Therefore, system 10 uses a satellite 20 which is preferably a Global Positioning System (GPS) satellite that can be accessed by commercial entities. Such a satellite referencing system is presently available and is provided by the Block II Satellites that are now being launched.

Turning for the moment to a specific consideration of the on-site station 14, it is to be appreciated that this station 14 includes a detector, or detectors (not shown). Importantly, the detectors which are used at on-site station 14 should be able to identify and quantify nuclear waste, such as low level rad waste (LLRW) and tranuramic waste (TRU), as well as hazardous toxic chemical waste products. Further, the detectors at on-site station 14 should be individually or collectively able to sample material whether it be located on the surface of the earth, in the air, or buried subsurface. These detectors should also be selected for their ability to determine the contamination level and analyze the contaminant in situ without having to extract and remove the sample being measured from its natural location.

In the operation of the system 10, a site 22 is selected for characterization and the mobile on-site station 14 is moved into the area of site 22 to a position where it can measure the contamination level at a preselected point 24. The detector (not shown) at on-site station 14 then measures the contamination level at point 24, and this information is transmitted to the base station 12 as indicated by the arrow 26. Simultaneously, position data concerning the location of point 24 in site 22 relative to an earth-based coordinate reference 28 is sent to the base station 12. More specifically, the position data of point 24 is included in a signal that is received from the GPS satellites 20, 20a, 20b and 20c by a transceiver (not shown) at on-site station 14, and then relayed by the transceiver to base station 12. The flow of this signal is shown in the Figure by the arrow 30 which indicates a transmission from GPS satellites 20 to on-site station 14 and by arrow 32 which indicates the relay of this signal from on-site station 14 to the base station 12. In accordance with the above-described flow of information, both contamination level data and position data are provided at base station 12 for subsequent use.

An arrow 34 is shown in the Figure connecting base station 12 with on-site station 14 to indicate a communications capability between the two stations. This capability is provided by transceivers at the respective stations which allow base station 12 to direct the field operations of the on-site station 14. The communication capability also permits cooperation between stations to increase the flexibility of system 10 and to refine the data being transmitted from on-site station 14 to base station 12.

The Figure also shows an arrow 36 which represents a data link between the satellites 20 and the base station 12. Specifically, this link is established to obtain position data information concerning the position of base station 12 relative to GPS satellites 20 and, hence, the topographical location of base station 12. Importantly, with position data available at base station 12 for both base station 12 (i.e. arrow 36) and on-site station 14 (i.e. arrows 30, 32), the exact topographical location of on-site station 14 can be refined. Specifically, the Eagle VIII Real-Time Differential (RTD) System marketed by Motorola Inc. correlates signals from the GPS satellite constellation with a plurality of earth-based stations to obtain positional accuracies for the earth-based stations which are within the range of two to five (2-5) meters.

As shown in the Figure, it is possible for system 10 to simultaneously characterize multiple sites. For instance, site 22 can be in the process of being surveyed by on-site station 14 while, at the same time, site 38 is being surveyed by on-site stations 16 and 18. In all important respects, the on-site stations 16, 18 are similar to on-site station 14. Specifically, each of the on-site stations 16, 18 has a detector (not shown) and transceiver (not shown) which perform the same functions disclosed for similar components discussed above with respect to on-site station 14. More specifically, the arrows 40 and 42 respectively indicate the transmission of position data signals from GPS satellite 20 to on-site stations 16, 18. These signals, together with contamination level data and communication data, are passed from the on-site stations 16, 18 to base station 12 over the transmission links indicated in the Figure by arrows 44, 46.

With the collection of data from on-site stations 14, 16 and 18, and the ability to communicate with these stations to direct their field operations, base station 12 is able to characterize the sites 22 and 38. As can be appreciated, this entails taking the position data concerning the topographical location of selected points (e.g. point 24) within the areas of the sites 22 or 38, and correlating this position data with contamination level data measured at the selected point. The compilation of this correlated data, together with applicable regulatory requirements, results in a site characterization and remediation needs report 48 which is useful for quarantining contaminated areas and directing subsequent clean-up operations.

In summary, system 10 comprises a base station 12 which is established to correlate and compile data received from various on-site stations 14, 16, 18, and to publish a site characterization and remediation needs report 48. This report 48 necessarily includes information concerning both the level and nature of contamination at a preselected point 24 in a site 22, and the topographical location of this point 24. The information concerning the level and nature of the contamination at point 24 is developed in situ at the on-site stations 14, 16, 18 and then transmitted directly to base station 12. The information concerning the topographical location of point 24 is acquired by signals which originate from a GPS satellite and which are received and then relayed by the on-site stations 14, 16, 18 to base station 12. As discussed above, a separate signal from the GPS satellites to base station 12 can be used to refine the topographical location information that pertains to selected points, such as the point 24.

While the particular integrated automated system for waste site characterization as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A Global Positioning System (GPS) satellite constellation referenced site characterization system which comprises:
    a base station;
    a land based on-site station including a detector for determining a contamination level at selected points on and below the surface of said site, and a transceiver at said on-site station for relaying a first signal from said constellation to said base station indicative of the topographical position of said on-site station, and for sending a second signal to said base station indicative of said contamination level at said selected point; and
    a transceiver including means positioned at said base station to receive and correlate said first and second signals for characterizing said site.

2. A GPS satellite constellation referenced site characterization system as recited in claim 1 wherein said base station transceiver receives a third signal from said constellation indicative of the relative position of said base station to said constellation to establish the topographical location of said base station for correlating said third signal with said first signal to refine said first signal.

3. A GPS satellite constellation referenced site characterization system as recited in claim 1 further comprising a probe, said detector being mounted on said probe for movement therewith.

4. A GPS satellite constellation referenced site characterization system as recited in claim 1 further comprising a plurality of said on-site stations.

5. A GPS satellite constellation referenced site characterization system as recited in claim 1 further comprising means for compiling a plurality of correlated first and second signals to characterize said site.

6. A GPS satellite constellation referenced site characterization system as recited in claim 1 wherein said on-site station is mobile.

7. A GPS satellite constellation referenced site characterization system as recited in claim 1 wherein said base station is mobile.

8. A GPS satellite constellation referenced site characterization system which comprises:
    a base station;
    means for detecting a contamination level at selected points on and below the surface of said site;
    means for relaying a first signal from said constellation via said selected point to said base station, said first signal being indicative of the relative position of said point with said constellation to establish the topographical location of said selected point;
    means for transmitting a second signal from said selected point to said base station, said second signal being indicative of said contamination level; and
    means at said base station for combining said first and second signals to characterize said site.

9. A GPS satellite constellation referenced site characterization system as recited in claim 8 further comprising means for combining said first and second signals to prepare a site characterization and remediation needs report.

10. A GPS satellite constellation referenced site characterization system as recited in claim 8 further comprising means for receiving a third signal from said constellation at said base station, said third signal being indicative of the relative position of said base station with said constellation to establish the topographical location of said base station.

11. A GPS satellite constellation referenced site characterization system as recited in claim 10 further comprising means to correlate said first and third signals for refining said first signal.

12. A GPS satellite constellation referenced site characterization system as recited in claim 8 wherein said detecting means, said first signal relaying means and said second signal transmitting means, in combination, establish an on-site station.

13. A GPS satellite constellation referenced site characterization system as recited in claim 12 wherein said on-site station is mobile for movement within the area of said site.

14. A GPS satellite constellation referenced site characterization system as recited in claim 12 which comprises a plurality of said on-site stations.

15. A GPS satellite constellation referenced site characterization system as recited in claim 8 wherein said base station is mobile.

16. A method for characterizing a site using GPS satellite constellation referenced locations at the site which comprises the steps of:
establishing a land based on-site station to detect a contamination level at selected points on and below the surface of said site;
relaying a first signal from said constellation to a base station via said on-site location, said first signal being indicative of the topographical location of said point;
transmitting a second signal from said on-site station to said base station indicative of said detected contamination level; and
correlating said first and second signals to characterize said site.

17. A method for characterizing a site using GPS satellite constellation referenced locations at the site as recited in claim 16 further comprising the steps of:
receiving a third signal from said constellation at said base station, said third signal being indicative of the topographical location of said base station; and
correlating said first signal and said third signal to refine said first signal.

18. A method for characterizing a site using GPS satellite constellation referenced locations at the site as recited in claim 16 further comprising the step of boring into the surface of the earth to detect subsurface contamination levels in situ.

19. A method for characterizing a site using GPS satellite constellation referenced locations at the site as recited in claim 16 further comprising the step of establishing a plurality of said on-site stations.

20. A method for characterizing a site using GPS satellite constellation referenced locations at the site as recited in claim 16 further comprising the step of moving said on-site station over said site.

21. A method for characterizing a site using GPS satellite constellation referenced locations at the site as recited in claim 16 further comprising the step of preparing a site characterization and remediation needs report using said correlated first and second signals.

* * * * *